April 18, 1967　　　V. H. GAJARDO　　　3,314,666
FAST FIRE TUNNEL KILN
Filed Nov. 10, 1964　　　　　　　　　　　　　2 Sheets-Sheet 2

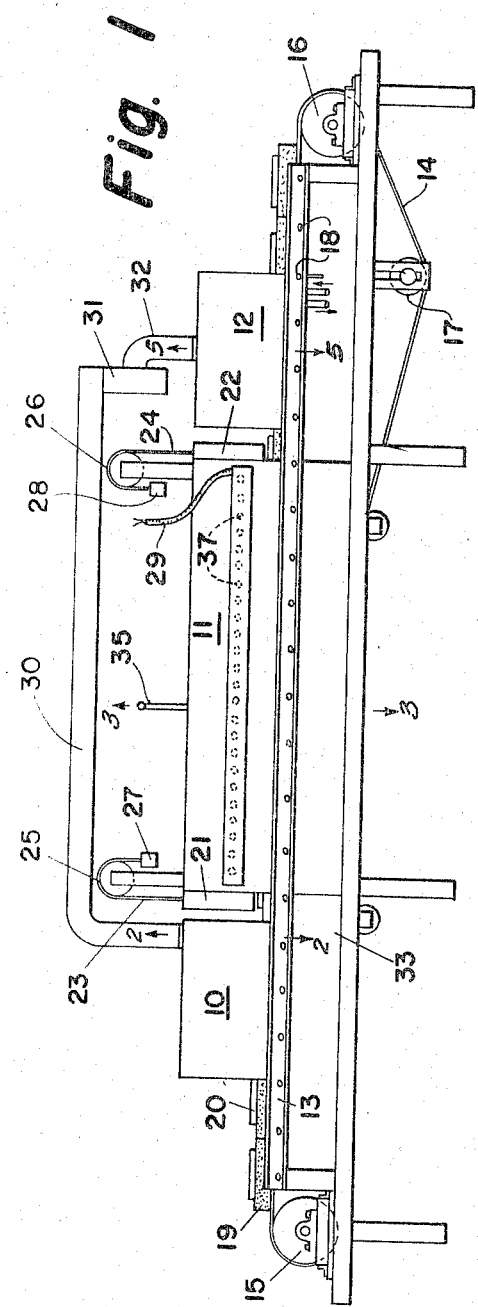

3,314,666
FAST FIRE TUNNEL KILN
Vincent H. Gajardo, Fairless Hills, Pa., assignor, by mesne assignments, to Cyprus Mines Corporation, Trenton, N.J., a corporation of New York
Filed Nov. 10, 1964, Ser. No. 410,065
6 Claims. (Cl. 263—28)

This invention relates in general to tunnel kilns, and in particular to tunnel kilns which are adapted for the heating, baking and sintering of refractory materials such as ceramics, metals, asbestos, mica and other materials which require high temperatures for treatments of various kinds.

The conventional tunnel kiln comprises, in general, three temperature zones: a first zone of relatively low temperature to preheat the ware to dry it and remove organic materials; a second zone of highest temperature for the firing, glazing or sintering of the ware, and a final zone for cooling the heated ware. In prior tunnel kilns these zones have been provided in a single continuous tunnel by varying the temperature in each of the several zones as required. Such kilns also frequently utilize cars mounted on wheels and running through the tunnel on rails, each cart being pushed into the preheater while a treated cart is thus shoved out at the end of the cooling zone.

Such prior tunnel kilns have many disadvantages that are overcome by the present invention, inter alia: (a) the prior kilns are very wasteful of heat because the cars and related equipment must be heated each time they pass through the tunnel, although it is only the ware that actually needs the heat; (b) the prior tunnels are usually open from end-to-end so that gases, moisture and other volatile materials driven off the goods during the preheating mingle with the heated gas in the firing section, thus contaminating the goods. Likewise, it has been proposed to take hot gases from the firing zone and use them to transfer heat to the preheating zone, but such gases are also contaminated and affect the quality of the product.

Therefore, it is a general object of the present invention to provide a continuous tunnel kiln which will reduce the amount of heat and time necessary to treat a particular ceramic or metal ware.

A second object of the invention will be to provide a continuous tunnel kiln that will prevent the contamination of the ware with gases derived from the firing zone.

A third object of the invention will be to heat the ware substantially on the upper surface but with adequate heat transfer to the lower part of the ware so that warping does not take place.

Another object of the invention will be to provide novel carrier batts for supporting the ware that will effect a rapid and efficient heating of the ware.

A further object is to provide means for a more uniform radiation of heat to the ware to produce a more uniform product.

Other objects of the invention will be obvious or will be apparent from the following detailed description.

According to the invention there is provided a tunnel kiln comprising three separate sections: a preheater chamber, a firing chamber and a cooling chamber, arranged and positioned end-to-end to provide a continuous path but with each section insulated from the other, and an endless porous conveyer positioned and arranged to pass the ware through said chambers in succession, said conveyer carrying on its upper surface a ceramic batt for supporting the ware, the batt preferably comprising an upper section formed of a heat-radiating ceramic material supported upon a lower section comprising a porous ceramic material. In a preferred embodiment, the batt is provided upon its upper work carrying surface with a plurality of grooves having a parabolic cross-section, the surfaces of the grooves and the walls of the preheating chamber and the firing chamber being coated with potassium titanate for reflecting radiation.

For a more complete understanding of the nature and objects of the invention, reference should be had to the accompanying drawings in which:

FIG. 1 shows a diagrammatical plan view, in side elevation, of the tunnel kiln of the present invention;

FIG. 2 shows a cross-section of the preheating chamber taken through the line 2—2 of FIG. 1;

FIG. 3 is a cross-section of the firing chamber taken through the line 3—3 of FIG. 1;

FIG. 4 is a perspective view of a portion of the firing chamber, partly cut away;

Figure 5:
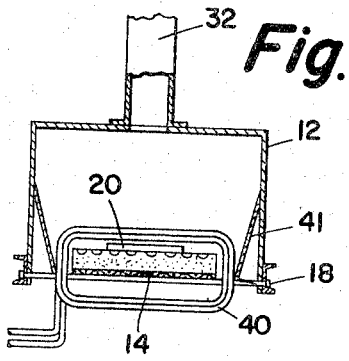
FIG. 5 is an end elevation, partly in section, showing one embodiment of the cooling chamber.

Referring to FIG. 1, the tunnel of the invention comprises a preheating chamber 10, a firing chamber 11 and a cooling chamber 12 mounted in sequence end-to-end on a common frame 13. A flexible endless belt 14 made of perforated thin metal or wire mesh is arranged to travel around two end rollers 15 and 16 and pass continuously through the tunnel. A third roller 17 may be used to provide necessary tension in the belt. The belt 14 is supported inside the chamber by sliding over horizontally spaced rods 18 extending transversely of the tunnel and the ends of which are mounted on the frame 13. These rods are also shown in FIGS. 2, 3 and 5 as supporting the belt. To support the ware or goods to be heat-treated, the belt 14 carries on its upper surface, either free or attached thereto, a series of batts 19 upon which the ware in the form of work pieces, for example, a ceramic tile 20, may be supported as it passes through the several chambers. The chambers of the kiln may be constructed of refractory material either such as sheet metal or brick and insulated on the inner surface with conventional insulation suitable for the temperatures to be utilized.

In the preferred embodiment of the invention, the inner surfaces of the preheating and firing chamber are coated with a heat-reflecting coating, for example, a thin layer of potassium titanate or the like.

It should be noted that each of the three chambers, namely the preheater, the firing chamber and the cooling chambers, are separated by insulated gates 21 and 22 which are supported on cables 23 and 24 passing over pulleys 25 and 26, and counterbalanced by weights 27 and 28. The gates are positioned so that the bottom edge clears the top of the ware but insulates the chamber from loss of heat and gases into the adjacent chambers.

The preheating chamber

Details of the preheating chamber are illustrated in FIG. 2 from which it will be noted that the chamber is provided with one or more tie rods 18 to support the endless belt 14 upon which the batt 19 rests, and supports the ware 20, for example, a tile. Hot air to heat this chamber is provided at its rear end through duct 30, the heated air being driven by fan 31 from the duct 32 connected with the precooling chamber 12. It will be apparent that, with this arrangement, the gas to preheat the ware 20 and the batt 19 is pure air from the atmosphere which has been heated by the cooling of the hot ware and the heated batts as they pass through the cooling chamber. Thus, the preheated air passes countercurrent to the ware as it moves through the preheater. However, because of the insulated gate 21 between the preheater and the firing chamber, none of the organic matter or fumes from the preheater is permitted to contaminate the ware in the firing chamber 11. Since the primary purpose of the preheater 10 is to drive out moisture and to burn out organic matter that may be included in the ware, the temperature may vary from 300° F. to 1800° F. The higher temperatures are to condition the ware to the shock of being subjected to the higher temperatures in the firing chamber 11. The front end of the preheating chamber may be open to the atmosphere; likewise, the rear end of the cooling chamber can be open to the atmosphere.

The firing chamber

As shown in FIG. 4, the firing chamber is lined with a refractory material such as the bricks 36, the base bricks of which are provided with a recess forming a port 33 for the entry of air, the air flowing up into the chamber through the spaces 34 formed by spacing the base bricks 36 slightly apart. This chamber is also provided with a number of tie rods 18 for supporting the endless belt 14 which supports the batts 19 carrying the ware 20. The firing chamber may be heated by suitable means but, in the preferred embodiment, the heating is carried out by the use of a plurality of electrically heated resistance rods 37 connected to a suitable supply of electrical power by way of lines 29 (see FIG. 1), the rods being spaced transversely of the chamber just above the ware. The temperature can be measured by a thermocouple 35 inserted in the chamber 11. To increase radiation of heat, there is provided above the electric heating rods a sheet 38 of carborundum. The interior walls of the heating chamber are coated with a layer of heat reflective material, see later. Any gases or hot air derived from the firing chamber may be vented through vents 39 in the roof of this chamber, but if the gaseous products of the heating chamber are obnoxious, a conventional vent (not shown) may be provided above the heating chamber to exhaust such products. Since both ends of the heating chamber are substantially insulated and disconnected from the adjacent preheating or cooling chambers, there will be little or no passage of fumes from the firing chamber into these adjacent chambers. The temperatures to be maintained in the firing chamber will depend upon the wares being treated. Temperatures from 1800° F. to 2500° F. are suitable for imparting a glazed surface on ceramic wall tile. At these temperatures, the body and glaze sinter and the upper surface of the tile assume the desired smooth glossy surface.

The cooling chamber

The cooling chamber 12 has in the base one or more tie rods 18 upon which the endless belt 14 is supported which, in turn, supports the batts 19 and the ware 20. The cooling chamber is open at the outlet end and may be provided with perforations in the base (not shown). The belt, batts and ware are closely surrounded by a plurality of closely spaced cooling coils 40 through which a cooling fluid, such as cold water, continuously flows.

Figure 6:
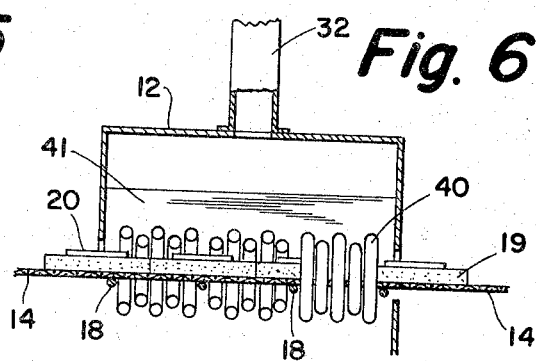
FIG. 6 is a side elevation partly in section showing the cooling chamber of FIG. 5 taken along the line 5—5 of FIG. 1.

The heat is transferred from the batts and ware to the coils. The hot air also generated during cooling is vented through the duct 32 and forced by the fan 31 through the duct 30 to the rear of the preheating chamber 10. On each side of the cooling coils suitable baffles 41 may be positioned to cause cool air from the atmosphere to be directed through the porous batt and over the ware. In the cooling chamber the ware can be cooled down to a temperature where it can be handled without warping, for example, down to about 300° F. From FIG. 6, it is noted that the cooling coils, in the preferred embodiment, comprise two layers of coils in overlapping relationship, so as to expose a large surface of cooling coil to the air in the chamber.

The supporting batts

Figure 7:
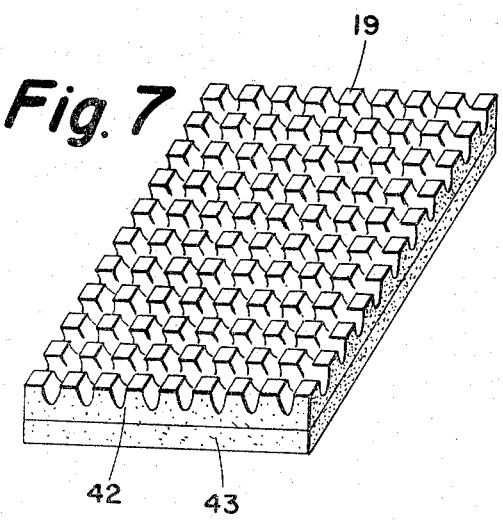
FIG. 7 is a perspective view of an embodiment of the batt used in the invention.
Figure 8:
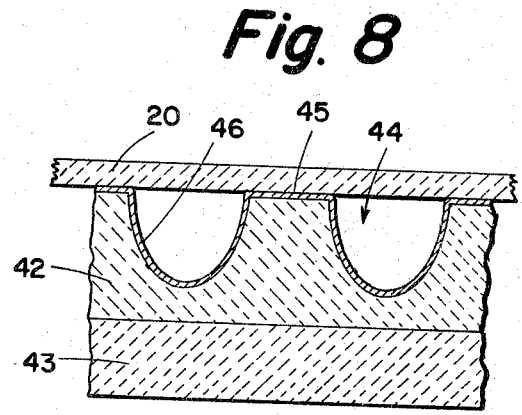
FIG. 8 is an enlarged cross-section of a portion of the batt of FIG. 7 showing the detail of the grooves.

The batts 19 used in the present kiln are of special composition and structure which provide maximum efficiency both as to heat transfer and durability. In the preferred embodiment, as shown in FIGS. 7 and 8, the upper portion 42 of the batt is formed of a strong, highly refractory material such as silicon carbide, while the lower portion, or layer 43, is composed of a more porous refractory material, such, for example, as aluminum silicate. The upper layer may be supported on the lower layer and, in fact, may be bonded thereto to form a unitary support for the ware. The top surface of the portion 42 of the batt is provided with a plurality of parallel grooves 44 which may extend in any direction across the batt. A second set of parallel grooves may also be provided to cross or intersect the first set of grooves to leave elevated portions or protuberances 45 arising from the base upon which the ware 20 rests. The grooves 44 are characterized by having a parabolic cross-section as shown in FIG. 8, so that the heat is radiated to the undersurface of the ware 20. In the preferred embodiment the surfaces of the grooves are coated with a relatively white heat-reflecting material which will be described later.

It is to be understood that the parabolic cross-sections are most desirable since they represent the most efficient shapes for radiant transfer of heat to the undersurfaces of the tile. However, grooves of circular cross-section, or other curvilinear character, will also increase the amount of radiant heat reflected to the undersurface of each tile.

Figure 9:
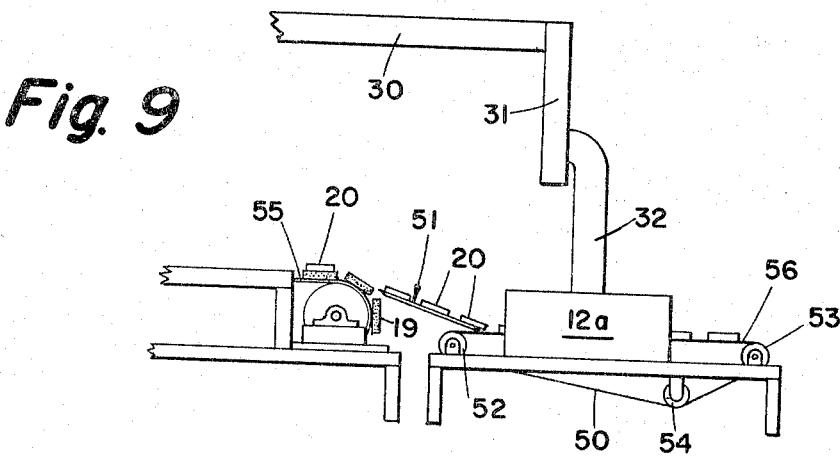
FIG. 9 is a side elevation of a second embodiment of the cooling chamber of the invention.

A second embodiment of the cooling chamber is shown in FIG. 9, in which the batts 19 are attached to the belt 14 by conventional means, not shown, so that the belt and batts pass around the end roller 16, the batts thus being returned to the preheating chamber while the tiles or ware 20 are transferred to a second endless belt 50 as by allowing them to slide down an inclined plane 51 onto the belt 50. The belt 50 passes around rollers 52, 53 and 54 and is so positioned as to convey the hot ware through a cooling chamber 12a. This chamber may be cooled by coils 40 and is otherwise constructed like chamber 12 of FIG. 5. A portion 55 of the belt 14 extends beyond the exit of the firing chamber 11 to allow time for the ware to cool to the solid state before it is transferred to the second belt 50. Further, a portion 56 of the belt 50 extends beyond the exit of the cooling chamber 12a to permit the ware to be removed from the belt 50, by conventional means, not shown. In this embodiment, the cooling chamber is spaced from and insulated from the firing chamber 11 so that no gases from the latter are drawn into the cooling chamber. Hot gas from the cooling chamber 12a is vented to the duct 32 and forced by the fan 31 through the duct 30 to the rear of the preheating chamber as shown in FIG. 1.

The embodiment shown in FIG. 9 has the advantage that only the ware (tiles) are cooled and the hot batts 19 are returned in heated condition to the preheating chamber, thus saving on heat requirements and lengthening the life of the batts.

The heat reflective coating

It has been found that the thermal efficiency of the present kiln is greatly improved by coating or laminating the surfaces of the grooves 44 and the inner surfaces of the walls of the preheating and firing chambers with a white, or substantially white, material able to withstand the high temperatures required in these chambers. Among the white materials which may be used for such a coating are finely divided or fibrous sodium trititanate, potassium titanate, zinc oxide, titanium dioxide and finely divided asbestos fibers. These materials, alone or in combination, may be finely ground and mixed or suspended in water to form a slurry which is sprayed or brushed on the surfaces to be covered. It has been found that, after initial drying of the coating, the fine particles and fibers adhere to the surfaces of the grooves and walls.

The preferred material for the white heat-reflective surface is fibrous potassium titanate ($K_2T_{16}O_{13}$). The low thermal conductivity of fibrous potassium titanate up to about 1200° C. is due to the high refractive index of the fibers and the fibrous structure of the coating or layer. Thus the coating or layer acts both as an insulator and a reflector of radiation. A suitable composition for a coating is made by dispersing potassium titanate fibers of about 1 micron diameter and with a length of about 0.5 to 1 mm. in water with mild mechanical mixing in the proportion of 10 parts water to 1 part fibers. This slurry is then applied as a coating to the upper surface (the grooved side) of the batts 19 and to the top and side walls of the preheating chamber and the firing chamber. Alternatively, the slurry may be sheeted as a paper or a thin layer which is laminated to the grooves of the batts 19 and to the walls of the preheating and firing chambers.

Tests have shown that tiles produced in the kiln not containing the white heat-reflective surfaces applied as described result in poor glazes on the tiles adjacent the chamber walls, while the same ceramic tiles made in a kiln and on batts having such heat-reflective material resulted in uniformity in the glaze of the tiles. The white surfaces of the grooves in the batts 19 resulted in the transfer of heat by reflection to the lower surfaces of the tiles to minimize the temperature differences and reduce warping.

The kiln of the present invention has many uses in industry, for example, in hardening of pottery, glazing of ceramic tiles, for producing porcelain, for enameling metal particles, inlaying a low-melting metal into or adhering it to a high-temperature metal, for sintering metal powders and fibers for the production of solid metal objects, for production of bricks, concrete blocks and tubes, for producing grinding wheels, and various products from cermets.

Among the many advantages of the present kiln are the following:

(1) Speed and quantity of production: for example, with a conventional tunnel kiln of the type in which cars loaded with ceramic tile are pushed through a continuous tunnel 192 feet long, it requires sixteen hours for the firing cycle for the treatment of some 84,000 square feet of tile. In contrast, in the kiln of the present invention, with a length of 150 feet and with a firing cycle of thirty minutes, an output of 120,960 square feet of tiles per 16-hour period can be obtained.

(2) The thermal requirements are substantially reduced with the present kiln compared with the conventional kiln because there is no need to heat and reheat a quantity of so-called kiln furniture, such as cars, racks, wheels and supporting tracks.

(3) The unique batt used in the present kiln has a structure provided with curvilinear, preferably parabolic-shaped, grooves therein so that the ware is heated both from the top and from the bottom, thus preventing warping and cracking due to unequal expansion of the ware.

(4) Because the present kiln separates the three chief chambers: the preheating chamber, the firing chamber and the cooling chamber, the temperatures and conditions within such chambers can be controlled better than when the tunnel kiln consists of a single open tube in which varying temperature zones are to be established for carrying out the functions of drying, firing and cooling.

(5) By utilizing the exhaust hot gases from the cooling chamber to preheat the ware in the preheating chamber, the ware is not exposed to organic gases or fumes, dust or other material that might damage the surface of the ware.

(6) By supporting the ware upon a continuously moving belt the ware is not subjected to shifting or shock as occurs when the ware is loaded in a car and the car is suddenly pushed into the conventional tunnel dryer.

(7) The use of potassium titanate as a heat-reflecting coating in the grooves of the batts and on the walls of the preheating and firing chambers greatly improves heat transfer, in these chambers, to the ware.

Now that the invention has been explained in detail, as applied to a preferred embodiment, it is to be understood that changes may be made without departing from the scope and spirit of the invention, and certain features used in the absence of other features, all within the spirit and scope of the appended claims.

What is claimed is:

1. A tunnel kiln comprising
three chambers in sequence, a preheating chamber, a firing chamber and a cooling chamber,
means for insulating said chambers from each other,
a conveyer for passing ware continuously through said chambers,
a refractory batt on said conveyer for supporting ware, said batt having the shape of a plate and having on its ware-supporting surface parallel grooves of parabolic cross-section, the surfaces of said grooves and the heat-reflective walls of said preheating chamber and said firing chamber being covered with a layer of a substantially white refractory heat-reflective material, and
means for passing hot air from said cooling chamber into said preheating chamber.

2. A batt for supporting ware in kilns, furnaces and the like comprising a refractory material in the shape of a plate having on its ware-supporting surface parallel grooves, the surfaces of said grooves being covered with a layer of a white heat-reflective refractory material.

3. A batt as recited in claim 2 in which the layer on said grooves comprises fibrous potassium titanate.

4. A tunnel kiln comprising
three chambers in sequence, a preheating chamber, a firing chamber and a cooling chamber,
means for heating the preheating chamber and said firing chamber,
a continuous belt arranged and positioned to pass refractory ware-supporting batts through said preheating chamber and said firing chamber but not through said cooling chamber and for returning said batts to said preheating chamber, and
means for transferring ware supported on said batts into said cooling chamber after said ware has passed through said firing chamber.

5. A tunnel kiln comprising in sequence a pre-heating chamber and a firing chamber,
means for heating said chambers for preheating work in said pre-heating chamber and for the high temperature treatment of said work in said firing chamber,
refractory batts having downwardly curved surfaces for supporting the work in said chambers, and
a layer of white heat-insulating and heat-reflective refractory titanate material covering said downwardly curved surfaces and the walls of at least said firing chamber for reflection of radiation heat to the exposed surfaces of the work thereby more uniformly to heat the same,
said layer of titanate material being selected from the group consisting of sodium trititanate and potassium titanate.

6. The tunnel kiln of claim 5 in which said walls and said downwardly curved surfaces have thereon a layer of heat-insulating and heat-reflective material consisting of fibrous potassium titanate.

References Cited by the Examiner
UNITED STATES PATENTS

| | | | |
|---|---|---|---|
| 1,564,935 | 12/1925 | Burley | 25—142 |
| 2,174,597 | 10/1939 | Pyster et al. | 266—43 |
| 2,222,809 | 11/1940 | Curran | 263—8 |
| 2,246,448 | 6/1941 | Mahan | 25—153 |
| 2,515,416 | 7/1950 | Milligan | 25—153 |

FREDERICK L. MATTESON, Jr., Primary Examiner.

JOHN J. CAMBY, Examiner.